United States Patent [19]

Culhane et al.

[11] 4,026,668

[45] May 31, 1977

[54] CONTROL APPARATUS FOR SILVER HALIDE EMULSION MAKING

[75] Inventors: Gerald J. Culhane, Willowdale, Canada; Gary R. Layton, Pittsford; Walter E. Pittman, Rochester, both of N.Y.

[73] Assignee: Eastman Kodak Company, Rochester, N.Y.

[22] Filed: Nov. 24, 1975

[21] Appl. No.: 634,806

Related U.S. Application Data

[60] Continuation-in-part of Ser. No. 426,840, Dec. 20, 1973, abandoned, which is a division of Ser. No. 231,842, March 6, 1972, Pat. No. 3,821,002.

[52] U.S. Cl. .............................. 23/253 A; 417/22; 417/293

[51] Int. Cl.² .................... G01N 27/00; G03C 1/02

[58] Field of Search ......... 23/230 A, 253 A, 253 R; 96/94 R, 114.7; 417/22, 42, 293, 300; 137/93, 117, 118, 2, 87, 119

[56] References Cited

UNITED STATES PATENTS

| | | | |
|---|---|---|---|
| 1,951,035 | 3/1934 | Parker | 23/253 A X |
| 2,711,750 | 6/1955 | Norcross | 23/253 A UX |
| 3,031,304 | 4/1962 | Oliver | 96/114.7 |
| 3,129,717 | 4/1964 | Main et al. | 137/93 |
| 3,656,911 | 4/1972 | Hobbs | 23/253 A |
| 3,730,685 | 5/1973 | Prohaska | 23/253 A X |
| 3,733,473 | 5/1973 | Child et al. | 23/253 A X |
| 3,791,793 | 2/1974 | Friedmann et al. | 23/253 A X |

FOREIGN PATENTS OR APPLICATIONS

| | | | |
|---|---|---|---|
| 46-8841 | 3/1971 | Japan | 23/253 A |
| 559,001 | 1/1944 | United Kingdom | 23/253 A |

*Primary Examiner*—Joseph Scovronek
*Attorney, Agent, or Firm*—John D. Husser

[57] ABSTRACT

The disclosure relates to a control apparatus for the preparation of silver halide emulsions in which the flow rates of the reactants can be controlled to provide a desired pAg in the precipitation vessel. Several embodiments are used, depending upon the desired accuracy of pAg. The pAg and flow rate can also be caused to follow programs to maintain constant, or to vary, the pAg during a particular emulsion making process.

2 Claims, 7 Drawing Figures

CONTROL APPARATUS FOR SILVER HALIDE EMULSION MAKING

CROSS REFERENCE TO RELATED APPLICATIONS

This is a continuation-in-part of our earlier filed application Ser. No. 426,840, filed on Dec. 20, 1973 (now abandoned) which is a division of application Ser. No. 231,842, filed Mar. 6, 1972, now U.S. Pat. No. 3,821,002.

FIELD OF THE INVENTION

The invention relates to an apparatus for the preparation of silver halide emulsions and more particularly to an apparatus for controlling the delivery of individual reactants into a precipitation vessel while maintaining a preselected pAg therein or by following a flow rate or pAg variation program.

BACKGROUND OF THE INVENTION

U.S. Pat. No. 3,031,304 discloses a method of preparing fine grain nuclear track emulsions utilizing two Zenith gear pumps which pump mineral oil to displace the respective silver and salt solutions from separatory funnels into an aqueous gelatin solution contained in a reaction vessel. The silver ion concentration of the solution is followed potentiometrically with a silver electrode and a calomel electrode connected with salt bridges. Limit switches are wired into the potentiometric circuit so that when the pAg rises above a preselected level, a third pump subtracts 1% of the halide ion solution being forced by displacement from the separatory funnel containing the halide solution. The pAg varies widely at first, but after a few minutes the silver ion concentration becomes relatively steady. A fourth halide solution pump may be provided for manual operation in order that the halide ion supply can be properly adjusted by an operator from the observation of a potentiometer reading or from a strip recorder. It has been determined that a specific pAg can be obtained and maintained by having a specific amount of silver salt relative to a specific amount of halide salt flowing into the peptizer solution.

A prior art system for automated electronic control of silver halide emulsion preparation is that disclosed by Claes and Peelaers in Photographische Korrespondenz 102 Band, Nr 10/1967, pp. 162. In this prior art system, silver nitrate and alkali halide salt solutions are gravity fed to a precipitation vessel through two valves which are activated electronically to regulate the flow of the silver nitrate and alkali halide solutions. To keep a constant level of silver nitrate solution in what appears to be a separatory funnel, a relay is used. A recorder is used to monitor pH, pAg and also to control flow rates.

The advantages of continuously monitoring and controlling the pAg and/or the pH of the peptizer, silver salt solutions and halide salt solutions are recognized by those skilled in the art. Patent application Ser. No. 194,451, now U.S. Pat. No. 3,782,954 and Ser. No. 194,466, now U.S. Pat. No. 3,785,777, filed Jan. 12, 1972, a continuation and divisional, respectively, of U.S. Pat. application Ser. No. 876,893 filed Nov. 14, 1969 and now abandoned which is a continuation-in-part of U.S. application Ser. No. 854,629 filed Sept. 2, 1969, now abandoned, all to Porter and Johnson; Ser. No. 11,838 filed Feb. 16, 1970 to Wilgus and Ser. No. 159,914 filed July 6, 1971 to Owens, both now abandoned, all make clear that during the preparation of silver halide crystals, it is desirable that the pAg and the pH of the peptizer solution which contains silver halide mixture be continuously monitored and that the pAg and pH characteristics of the solution be continuously controlled by adjusting the proportions of the silver and/or halide salt solutions being added thereto in response to changes in the pAg. The above mentioned U.S. Pat. No. 3,031,304 and the Claes and Peelaers article show typical prior art control systems.

It is recognized that the preparation of silver halide emulsions is preferably carried out in a carefully controlled environment. For example, the accurate control of rates of addition, pAg, pH, and the duration of preparation as well as temperature and the relative uniformity of mixing of the reactants as added from two separate sources in addition to other such variables is desirable. It is also well known that variations in the initial rates of delivery of silver salt or halide salt solution into a precipitation vessel can have adverse effects upon the number of nuclei formed which is directly related to the final grain size of the emulsion produced. Consequently, the final light sensitive properties of the silver halide emulsion prepared are affected by the initial delivery rates of the silver salt and halide salt solution into the precipitation vessel. Despite the above-mentioned improved prior art devices and methods, there is still a continuing need for more accurate control of variables by sophisticated and programmable metering systems that will insure the preparation of more reproducible, extremely sensitive photographic emulsions which are characterized by uniformity in grain morphology, grain size and sensitometric properties.

Reference is now made to the drawings in which like numbers denote like parts and in which.

Figure 5A:
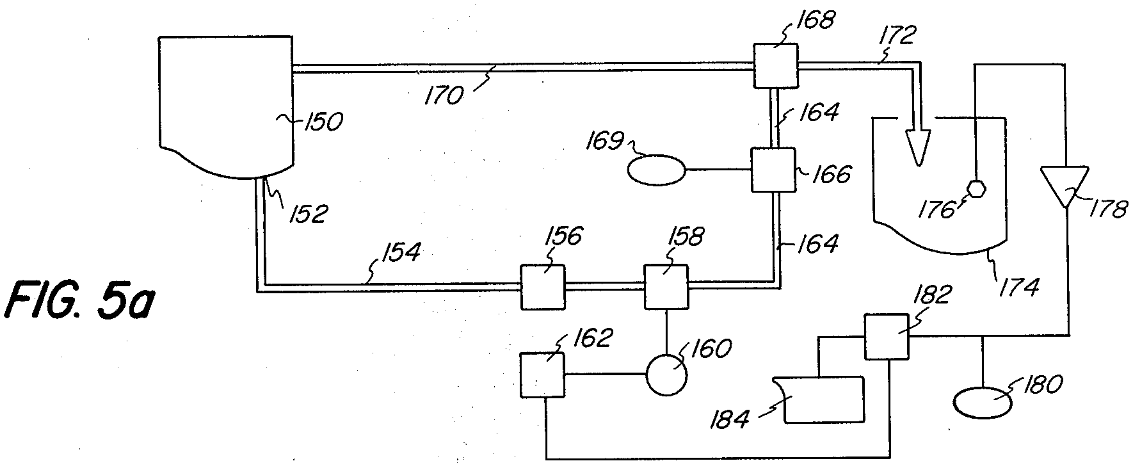
Figure 5B:
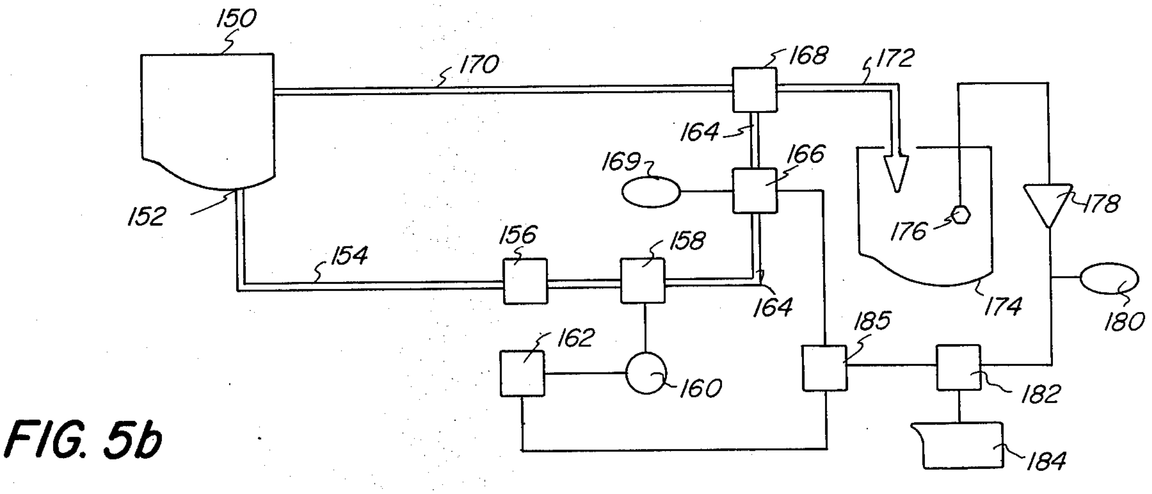

FIG. 5*a* shows an embodiment of the invention for following a predetermined pAg profile in an emulsion making process;

FIG. 5*b* shows an embodiment of the invention for programmed pAg control; and

Figure 6:
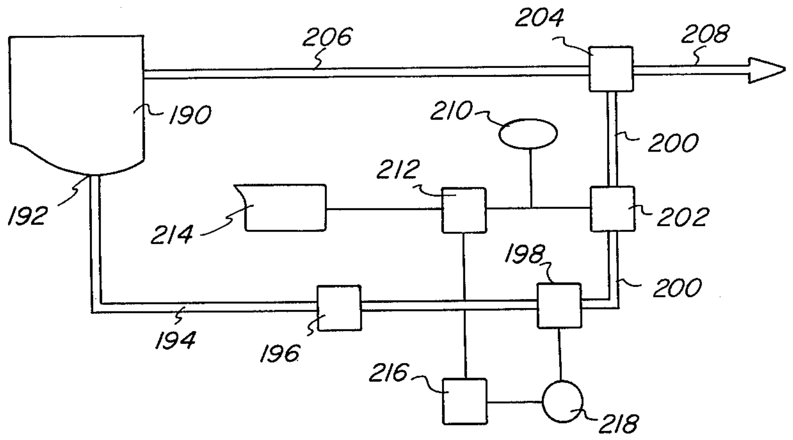

FIG. 6 shows a system in accordance with the invention providing programmed flow rate control to maintain a constant pAg.

DETAILED DESCRIPTION OF THE INVENTION

Figure 1:
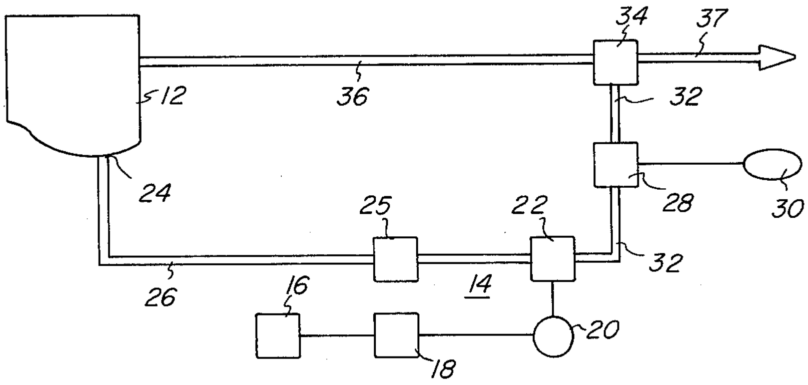
FIG. 1 shows a silver or halide salt solution flow rate control apparatus for emulsion preparations in accordance with the invention.

Turning now to FIG. 1, shown therein is a portable system which is preferably applied to emulsion making wherein the resulting silver halide preparation has a reproducibility of about ± 3%. A tank 12 acts as a container for either a silver salt or halide salt solution to be added to a peptizer containing precipitation vessel (not shown). A drive system generally designated 14 comprises an electrical potentiometer 16 to set pump speed, speed regulator 18 which is preferably of the SCR type for a drive 20 comprising a motor and gearbox which is preferably of the Westinghouse DC type. Drive 20 is connected to pump 22 which is preferably an ECO metering pump of the G series. However, a centrifugal pump and a pneumatic valve may be used instead of the ECO pump. Disposed on conduit 26 connecting tank 12 through the outlet 24 in tank 12 to pump 22 is tank valve 25. A flowmeter which is preferably a Fischer Porter magnetic flowmeter 28 comprising a 10D1418A transducer and 50SF2221-1B amplifier and a flow rate recorder 30 which can comprise any of several recorders well known to those skilled in the art are operably attached to conduit 32 which outputs from pump 22. A manually operable three-way recycling valve 34 which is preferably of the "sanitary" type is also connected to pump 22 through conduit 32 to control whether the solution from conduit 32 returns to tank 12 through return conduit 36 or outputs through conduit 37 to a precipitation vessel (not shown). The flow rate of solution is set by controlling the speed of pump 22 through variable speed DC pump drive 14. An equilibrium flow rate can be established throughout the delivery system comprising conduits 26, 32 and 36 prior to the passing of any silver or halide salt solution into a precipitation vessel through conduit 37 by utilizing three-way recycling valve 34 to recycle or return the solution to tank 12 until the equilibrium flow is established. By establishing this initial equilibrium flow rate prior to the addition of any salt solution into the peptizer solution the peptizer solution is substantially certain to have the desired pAg during the initial critical stage of nucleation. Thus, the salt solution flows out of tank 12 through outlet 24, conduit 26, valve 25 and into pump 22. The solution is pumped by pump 22 through conduit 32, through flowmeter 28 and into valve 34 which controls whether the solution flows back through line 36 into tank 12 or through outlet 37 once the desired or equilibrium flow rate is established. Different sizes of ECO gear pumps are available such that a wide range of flow rates are realizable. For example, ranges of from about 0.5 to about 3 gallons per minute, about 1.0 to about 12 gallons per minute and about 10 to about 25 gallons per minute are achievable with such pumps. The system of FIG. 1 is adapted to control silver salt solution as well as halide salt solution flow rates.

Figure 2:
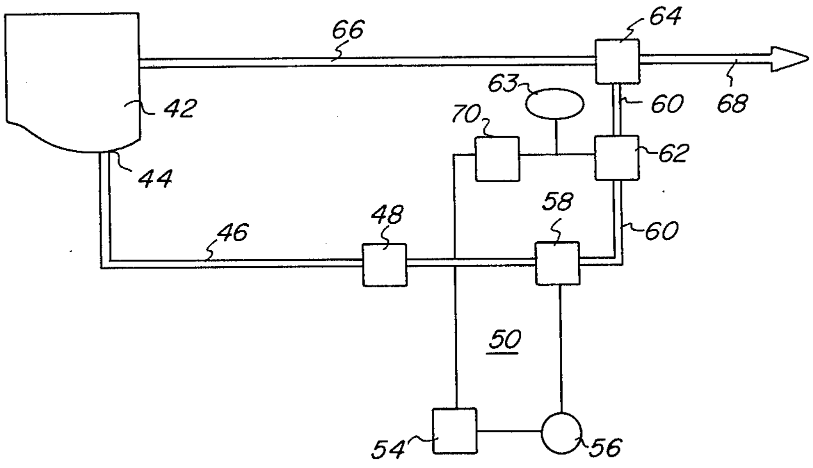
FIG. 2 shows a flow rate responsive control system for the delivery of silver of halide salt solutions into a precipitation vessel in the preparation of emulsions.

Reference is now made to FIG. 2. Shown therein is a system providing for reproducible control in the ± 1% range of silver and halide salt solution flow rates. Tank 42 containing silver or halide salt solution is connected through an outlet or drain 44 to conduit 46 which is connected to pump 58 through a tank valve 48. A pump drive system generally designated 50 comprises a speed regulator 54, preferably SCR for a Westinghouse DC drive, and a DC pump drive 56 comprising a motor and gearbox, preferably Westinghouse DC. Pump drive 56 is attached to pump 58 which is connected to conduit 46. The output of pump 58 is through conduit 60 wherein solution flow rate is monitored by a flowmeter 62, which is preferably a Fischer Porter magnetic flowmeter as in FIG. 1, and a flow rate recorder 63. After passing through flowmeter 62, the solution flows through the manually operable three-way recycling valve 64 and either back within return conduit 66 into the tank 42 or through output line 68 into a precipitation vessel (not shown). Generally, the flow is through return conduit 66 until a desired equilibrium or other selected flow rate is established at which time the three-way valve 64 is actuated to direct the flow through outlet conduit 68 into the precipitation vessel.

Valve 64 operates to return the solution through conduit 66 only during the initial stage of the operation. This is done to insure that the peptizer solution in the precipitation vessel will have the desired pAg during the early critical nucleation stage. After this critical stage valve 64 will always be opened to allow the solution to flow through conduit 68 and into the precipitation vessel. Any variance away from the desired pAg after the equilibrium flow has been established will be detected by a pAg sensor and corrected by varying the rate of flow of the solution accordingly.

A flow rate process controller 70, which is preferably a Taylor flow rate process controller such as Model No. 844RD is responsively connected to flowmeter 62 and operably connected to the input of pump speed regulator 54. Process controller 70 performs a feedback function in that in response to changes in the output of flowmeter 62, controller 70 adjusts pump speed through regulator 54 to control the flow rate of the salt solution through the system. By using the preferred Taylor flow rate process controller 70 in the system of FIG. 2, the solution flow rate is reproducible within ± 1%. The system of FIG. 2 is adapted to control the flow rate of silver salt solution as well as halide salt solution.

Figure 3:
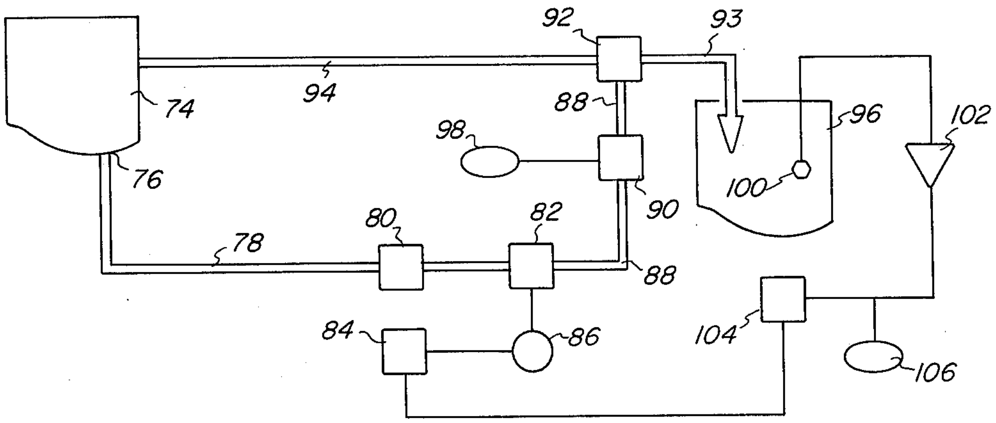
FIG. 3 shows a system in accordance with the invention which has pAg responsive flow rate control.

Direct pAg control for halide salt solution delivery to maintain a constant pAg by controlling flow rate is achievable with the system shown in FIG. 3. Tank 74 is similar to tanks 12 and 42 of FIGS. 1 and 2, respectively, and drains through an outlet 76 into conduit 78, through tank valve 80, into a pump 82 which is preferably an ECO gear pump. A speed regulator 84 which is preferably an SCR speed regulator for a Westinghouse DC drive regulates the speed of a pump drive 86 which preferably comprises a Westinghouse DC drive operatively connected to pump 82. The solution outputs from pump 82 into conduit 88 and flows through magnetic flowmeter 90 which is connected to a flow rate recorder 98, to the manually operable three-way recycle valve 92 from where the fluid is returned through conduit 94 to tank 74 if the desired equilibrium flow has not been reached or is otherwise delivered through conduit 93 into precipitation vessel 96. Valve 92 is only operating to return the solution through conduit 94 during the initial stage of operation. After this stage there is direct control of the pAg itself through the use of a pAg sensor and a pump speed regulator (see below). A pAg sensing electrode 100 is located under the surface of the peptizer solution (not shown) in vessel 96. A pAg analyzer 102 which is preferably Model No. 941 of the Beckman Instrument Company is connected to sensing electrode 100 and to a pAg process controller 104 which is preferably a Honeywell Electrovolt Controller and which controls the SCR speed regulator 84. A pAg recorder 106 is connected to pAg analyzer 102. The speed of the pump 82 delivering a salt solution to precipitation vessel 96 is controlled in response to the sensed pAg of the solution in vessel 96. Pump 82 is controlled in order to maintain a constant pAg in vessel 96 by controlling flow rate of the salt solution into vessel 96.

Figure 4:
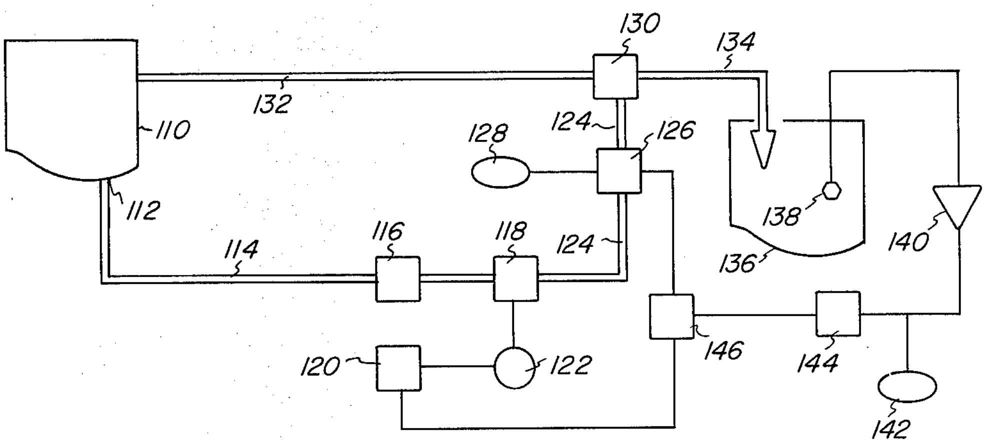
FIG. 4 shows a system in accordance with the invention which provides pAg responsive cascade flow rate control.

The system shown in FIG. 4 controls the halide salt solution flow rate to maintain a constant pAg in a precipitation vessel by minimizing pAg variability at the commencement of silver halide precipitation. In the system of FIG. 4, the use of cascade or minor loop control of the control system reduces the effect of load changes on the delivery system by decreasing the effective time constant of the delivery system, i.e., the time it takes for the delivery system to respond to pAg changes in the precipitation vessel. The silver salt solution flow rate is controlled as shown in FIG. 2. Tank 100 containing halide salt solution releases the solution through an outlet 112 into conduit 114 through which the solution flows past tank valve 116 and into pump 118. Controlling the speed of pump 118 are a speed regulator 120 and a pump drive unit 122. The preferred pump 118, speed regulator 120 and pump drive unit 122 as well as other system elements of similar designation and function are preferably the same as those disclosed with reference to FIGS. 1–3. From pump 118 the solution is carried through conduit 124 and past magnetic flowmeter 126 which is operatively connected to flow rate recorder 128. From flowmeter 126, the solution enters manually operable three-way recycle valve 130 which, in the initial stage of operation, operates to either return the solution to vessel 110 through conduit 132 or to allow the solution to pass from valve 130 through conduit 134 into the peptizer solution in vessel 136. A pAg sensing electrode 138 is disposed under the surface of the peptizer solution (not shown) in vessel 136 and connected to pAg analyzer 140 which is in turn connected to pAg recorder 142. Analyzer 140 is connected to a pAg process controller 144 such as the Honeywell Electrovolt Controller and a flow rate process controller 146 which is preferably the above mentioned Taylor flow rate process controller. Magnetic flowmeter 126 is also connected to the Taylor flow rate process controller 146. Delivery rate of the halide salt solution is controlled by the controller 146 in response to signals from flowmeter 126 and the pAg sensing controller 144. Thus, the Taylor flow rate process controller 146 in response to flow rate and pAg through inputs from the halide salt solution magnetic flowmeter 126 and the pAg process controller 144 regulates the speed of pump 118 which delivers the halide salt solution to maintain a fixed pAg in the precipitation vessel by adjusting the flow rate of the salt solution into the vessel.

The systems shown in FIGS. **5*a* and 5*b* are for controlling the flow rate of the halide salt solution during emulsion preparation to cause the pAg in the precipitation vessel to follow a predetermined pAg profile. FIGS. 5*a* and 5*b* show a tank 150 for holding halide salt solution, with drain 152 connected to conduit 154 through which the salt solution passes to tank valve 156 and to pump 158. Controlling pump 158 is drive 160, the speed of which is controlled by an SCR speed regulator 162. The preferable components of this embodiment are those of similar function disclosed with reference to FIGS. 1–4. Pump 158 pumps solution through conduit 164 past magnetic flowmeter 166 to three-way recycling valve 168. A flow rate recorder 169 is operatively connected to flowmeter 166. The manually operable three-way recycling valve 168 is operated as mentioned with reference to FIGS. 1–4 to recycle the solution through return line 170 to tank 150 or run it through output line 172 into precipitation vessel 174. The solution is directed through output line 172 preferably when an equilibrium or other desired flow rate throughout the delivery system is established. A pAg sensing electrode 176 is located in precipitation vessel 174 so as to be in contact with peptizer solution disposed therein (not shown) and is connected to a pAg analyzer 178. A pAg recorder 180 and a pAg process controller 182 are connected to the output of analyzer 178. A set point generator 184 is connected to the pAg process controller 182. The set point generator 184 is preferably a Data-Trak Model 5500 (R-I Controllers Co., a subsidiary of Honeywell) and is used to change the set point of the pAg process controller 182 in a predetermined or programmed manner. It will be appreciated that other analog as well as digital devices well known to those skilled in the art can be used. Since the systems of FIGS. 5*a* and 5*b* are used to control the flow rate of the halide salt solution according to a predetermined pAg profile for a given emulsion preparation, by utilizing the FIGS. 5*a* and 5*b* systems of the pAg of the peptizer solution can continuously be changed within the precipitation environment during the entire emulsion making operation. As shown in FIG. 5*a*, the output of the pAg controller 182 which is responsive to pAg sensing electrode 176 and set point generator 184 is fed directly to the speed regulator 162 of the pump drive 160 to change the speed of the pump 158 to obtain flow rate adjustment to cause the pAg of the solution in vessel 174 to follow the pAg profile. As shown in FIG. 5*b*, the output of a pAg controller is fed to a flow rate process controller in the same manner as shown in FIG. 4.**

During the emulsion making process using the systems of FIGS. **5*a* or 5*b* for halide salt solution delivery, the delivery rate of silver salt solution is maintained constant by either of the systems shown in FIGS. 1 and 2 while the pAg is changed in a programmed fashion by one of the systems of FIGS. 5*a* and 5*b*.**

In the FIG. **5*a* system, the pAg set point generator 184 is used to change the set point on the pAg process controller 182 to cause the pAg of the solution within vessel 174 to follow the predetermined pAg profile. The pAg process controller 182 compares the pAg of the process with the sequence of pAg set points and changes the output of the ECO pump 158 in accordance therewith the pAg to cause changes in the precipitation vessel due to flow rate changes. In this manner, a predetermined pAg relationship with time is maintained during the emulsion making process in the vessel 174.**

In the cascade programmed pAg control system of FIG. **5*b*, the pAg set point generator 184 is used to change the set point on the pAg process controller 182 in accordance with a program to cause the pAg in the emulsion making environment to follow the pAg profile. The pAg process controller 182 compares the pAg of the process with each pAg set point and regulates the set point of the flow rate process controller 185. The flow rate process controller 185 compares the current flow rate as measured with the flowmeter with that required to adjust the pAg in accordance with the new set point for regulating the speed of the ECO pump 158. In this manner a predetermined pAg relationship with time is maintained in the emulsion making environment within vessel 174.**

Reference is now made to the embodiment shown in FIG. 6. This system provides a programmed flow of silver or halide salt solution. Tank 190 containing the salt solution has outlet 192 connected to conduit 194 running through a tank valve 196 to pump 198 which outputs through a conduit 200 to magnetic flowmeter 202 through which the solution passes to a manually operable three-way valve 204. Valve 204 recycles the solution back into tank 190 through line 206 or directs the solution through an output 208 into a precipitation vessel (not shown). Connected to flowmeter 202 is a flow rate recorder 210 and a flow rate process controller which is preferably a Taylor flow rate process controller 212. Additionally connected to flow rate process controller 212 is a set point generator 214, preferably the Honeywell Data-Trak device shown in FIGS. 5*a* and 5*b*. Set point generator 214 generates set point signals in accordance with a desired program. The Taylor flow rate process controller 212 controls the speed of pump 198 in response to signals from set point generator 214. Flow rate "feedback" from flowmeter 202 is applied to controller 212 such that the flow rate is changed to be commensurate with the program.

As described in the aforementioned U.S. patent application Ser. No. 11,838 filed Feb. 16, 1970 of Wilgus, it is sometimes desirable to nucleate silver halide grains at one delivery rate and then increase the delivery rate of the silver salt solution during the growth period of the silver halide grains to reduce the total precipitation time. With the system shown in FIG. 6, the set point generator 214 changes the set point of the silver salt solution flow rate process controller 212 according to a programmed flow rate profile. The pAg of the environment in the precipitation vessel is simultaneously controlled at a constant level as described with reference to FIGS. 3 and 4.

The silver salt solution flow can be controlled by the system shown in FIG. 6 and the halide salt solution flow can be controlled by the systems shown in 5*a* and 5*b*. When used in this way, the silver salt solution flow can be controlled according to a predetermined relationship with time, while at the same time the pAg can be continuously varied according to a separate relationship with time. Thus, the silver salt solution flow rate can be increased with time to reduce the time required for silver halide crystal growth and the pAg can be changed to obtain any desired grain morphology.

Both the halide salts and silver salts can be controlled as shown in FIG. 6. This controlled system provides programmed flow rate control of both silver salt solution and halide salt solution. The capability of increasing the rate of addition of silver salt solution shortens the growth time. Continuously changing the halide salt solution flow rate indirectly controls the pAg within the emulsion making environment.

As set forth above, FIGS. 1, 2 and 6 are preferably for the delivery of either silver salt or halide salt solutions. FIGS. 3, 4, 5*a* and 5*b* are preferably for the delivery of halide salt solution. Thus, the following combinations of systems are preferably used:

| Silver Salt | with | Halide Salt |
|---|---|---|
| FIGS. 1 or 2 | | FIGS. 1, 2, 3, 4, 5a or 5b |
| FIG. 6 | | FIGS. 1, 2, 3, 4, 5a, 5b, or 6 |

It will be appreciated by those skilled in the art that pAg control can be maintained in accordance with the invention by varying the silver salt solution addition rate by interchanging "silver" and halide wherever they appear in the above description with reference to FIGS. 3, 4, 5*a*, 5*b*. Alternatively, FIGS. 3, 4, 5*a* and 5*b* can be used for silver salt solution delivery. The following are alternative combinations which can be used for pAg control by varying silver addition rate:

| Halide Salt | with | Silver Salt |
|---|---|---|
| FIGS. 1 or 2 | | FIGS. 1, 2, 3, 4, 5a or 5b |
| FIG. 6 | | FIGS. 1, 2, 3, 4, 5a, 5b or 6 |

All the embodiments above described are portable. Too, recycle loops and recycle valves are provided for establishing equilibrium delivery rates prior to the addition of the silver salt in the halide salt solution into the precipitation vessel. The systems described for direct pAg control (FIG. 3) and cascade pAg control (FIG. 4) provide for the delivery of both the silver salt solution and the halide salt solution by flow rate control (FIG. 2) and then for a change to pAg control any time during the precipitation process. Too, an aim pAg for the process can be established immediately and the pAg controller can be used to maintain the aim pAg for the entire precipitation.

The metering apparatus and method described in accordance with this invention can be used with many types of mixing devices or emulsion making apparatus such as those described in the aforementioned U.S. patent application Ser. No. 159,914 filed July 6, 1971, of Owens; Agfa-Gevaert British Patent 1,243,356, patented Aug. 18, 1971; Frame and Johnson U.S. Pat. No. 3,415,650, issued Dec. 10, 1968; Johnson and Porter the aforementioned U.S. patent applications Ser. No. 194,451 and 194,466 which are a continuation and a divisional respectively of Ser. No. 854,629, filed Sept. 2, 1969, a continuation-in-part of Ser. No. 876,893, filed Nov. 14, 1969, both now abandoned; McCrossen and Owens U.S. Pat. No. 3,342,605, patented Sept. 19, 1967. The metering apparatus and method of the invention can also be used for coupler dispersion making such as the process described in the aforementioned Johnson et al. U.S. patent application Ser. No. 166,897, filed July 28, 1971.

The silver halide emulsions which can be prepared in accordance with this invention can comprise, for example, silver chloride, silver bromide, silver bromoiodide, silver chlorobromide, silver chloroiodide, silver chlorobromoiodide crystals or mixtures thereof. The emulsions may be coarse or fine grain emulsions by any of the well-known techniques, e.g., single jet emulsions such as those described in Trivelli and Smith, *The Photographic Journal*, Vol. LXXIX, May, 1939 (pp 330–338), double jet emulsions such as Lippmann emulsions, ammoniacal emulsions, thiocyanate or thioether ripened emulsions such as those described in Nietz et al. U.S. Pat. No. 2,222,264 issued Nov. 19, 1940; Illingsworth U.S. Pat. No. 3,320,069 issued May 16, 1967; and McBride U.S. Pat. No. 3,271,157 issued Sept. 6, 1966. Surface image emulsions may be used or internal image emulsions may be used such as those described in Davey et al., U.S. Pat. No. 2,592,250 issued May 8, 1952; Porter et al., U.S. Pat. No. 3,206,313 issued Sept. 14, 1965; Berriman, U.S. Pat. No. 3,367,778 issued Feb. 6, 1968; and Bacon et al., U.S. Pat. No. 3,447,927 issued June 3, 1969. If desired, mixtures of surface and internal image emulsions may be used as described in Luckey et al., U.S. Pat. No. 2,996,382 issued Aug. 15, 1961. The emulsions may be regular grain emulsions such as the type described in Klein and Moisar, *J. Phot. Sci.*, Vol. 12, No. 5, Sept./Oct., 1964, pp 242–251. Negative type emulsions may be used or direct positive emulsions may be used such as those described in Leermakers, U.S. Pat. No. 2,184,013 issued Dec. 19, 1939; Kendall et al., U.S. Pat. No. 2,541,472 issued Feb. 13, 1951; Berriman, U.S. Pat. No. 3,367,778 issued Feb. 6, 1968; Schouwenaars, British Patent 723,019 issued Feb. 2, 1955; Illingsworth et al., French Patent 1,520,821 issued Mar. 4, 1968; Illingsworth, U.S. Pat. No. 3,501,307 issued Mar. 17, 1970; Ives, U.S. Pat. No. 2,563,785 issued Aug. 7, 1951; Knott et al., U.S. Pat. No. 2,456,953 issued Dec. 21, 1948; and Land, U.S. Pat. No. 2,861,885 issued Nov. 25, 1958.

The invention has been described in detail with particular reference to preferred embodiments thereof, but it will be understood that variations and modifications can be effected within the spirit and scope of the invention.

We claim:

1. Apparatus for controlling the flow rate of a salt solution into a precipitation vessel of the type used in the preparation of a silver halide emulsion, said apparatus comprising:

a. means for containing a quantity of salt solution and having an outlet and return inlet;
b. first conduit means, connecting said outlet to said return inlet, for providing a closed path outside of said containing means for the salt solution;
c. second conduit means for directing salt solution into a precipitation vessel;
d. valve means, located in the closed path and movable between a first position and a second position, for selectively directing the salt solution from the container outlet to said return inlet or into said second conduit means;
e. means for moving solution from said container through said first conduit means at a predetermined rate;
f. means for sensing the flow rate of said solution through said first conduit means whereby establishment of an equilibrium flow rate can be determined prior to directing said salt solution into the vessel;
g. means for sensing the pAg of the solution within such a precipitation vessel after initial introduction of said salt solution and for producing a signal representative thereof;
h. means for generating a reference signal in accordance with a desired pAg profile; and
i. means for comparing the signal from said sensing means with said reference signal for controlling the flow rate of the salt solution into said vessel subsequent to the initial introduction of said salt solution.

2. The invention defined in claim 1 further including means, responsive to said sensing means, for providing a second signal indicative of flow rate into the vessel and wherein said control means utilizes said second signal.

* * * * *